Patented Apr. 14, 1942

2,279,557

UNITED STATES PATENT OFFICE 2,279,557

HOT MELT RUBBER CONDENSATION DERIVATIVE COMPOSITION

William C. Calvert, Gary, Ind., assignor to Marbon Corporation, Gary, Ind., a corporation of Delaware No Drawing. Application July 25, 1938, Serial No. 221,097

2 Claims. (Cl. 260—734)

This invention relates to a composition comprising a rubber derivative which is particularly suitable for hot melts. More particularly the invention relates to a composition containing a resin-like thermoplastic condensation derivative of rubber which, when coated in the molten condition on sheet or other material, gives a clear glossy, relatively non-tacky coating at room temperature.

One embodiment of the invention is a thermoflowable composition comprising an intimate mixture of a condensation derivative of rubber and, as a plasticizer therefor, a relatively non-volatile solvent for the oxidized condensation derivative of rubber. The thermo-flowable composition also preferably contains a wax, so that when the composition is used for coating the coating will have the required slip, and also preferably a resin to aid blending and increase adhesion.

The term condensation derivative as used in this specification is defined as the union of two or more organic molecules or parts of the same molecule, with or without elimination of the component elements, in which the new combination is effected between carbon atoms. It is not intended to include such materials as chlorinated rubber or rubber hydrochloride in which cyclization, if it takes place at all, is incidental and of very minor extent.

Condensation derivatives of rubber contemplated in this invention include (a) the product obtained by reacting rubber or a rubber solution with a halide salt or a halogenated acid of a metal having a plurality of secondary valences, such as tin tetrachloride or tetrabromide, antimony pentachloride, titanium tetrachloride, boron tri-fluoride, fluoboric acid, chlorostannic or chlorostannous acid and the like, as described by Thies and Clifford in the "Journal of Industrial and Engineering Chemistry," vol. 26, p. 123 (1934); (b) the product obtained by reacting rubber or a rubber solution with a phenol and an acid or acid producing substance.

The preferred (b)-substance is obtained by reacting undissolved rubber immersed in a bath of cresol or other phenol in the presence of hydrochloric acid at a temperature above 125° C., the ratio of phenol to undissolved rubber being above 75 parts of phenol to 100 parts of rubber by weight, as described in the application of John P. McKenzie, Serial No. 180,833, filed Dec. 20, 1937.

It has been discovered that the presence of solvents for oxidized condensation derivatives of rubber with the condensation derivatives of rubber makes possible the production of coating of glass-clear transparency even with high proportion of condensation derivatives and when wax is present in the composition.

As a solvent for oxidized condensation derivatives of rubber the polysubstituted naphthalenes have been found most satisfactory. These include diamyldecahydronaphthalene, triamylnaphthalene and diamylnaphthalene. Another suitable solvent is triamylcylohexane. The suitability of materials is determined by heating the mixture of condensation derivative of rubber and material at 300° C. for one hour. At this temperature partial oxidation of the condensation derivative takes place and unless the material tested is a solvent for the oxidized rubber derivative, it separates from the rubber derivative.

As the wax constituent of the composition a paraffin wax is contemplated, and preferably a high melting point paraffin wax, that is to say, paraffin wax having a melting point of at least 55° C. The higher melting paraffins, especially those melting above 60° C., yield coatings having a higher degree of moistureproofness, as well as exhibiting an improved slip and freedom from smearing in the final product. Alternatively, any other wax or wax-like substance capable of moistureproofing may be used, or may be used in combination with paraffin wax of the higher melting point type. Among such waxes may be mentioned certain animal and vegetable waxes such as, for example, carnauba wax, shellac wax, candelilla wax, beeswax, Japan wax, Chinese insect wax and the like. Certain synthetic waxes or wax-like materials such as, for example, hydrogenated castor oil, chlorinated naphthalene, esters of long chain alcohols and long chain fatty acids, etc., may also be used in combination with the moistureproofing wax above mentioned. The use of hard waxes, such as carnauba wax and candelilla wax is particularly desirable in these compositions in that they materially improve the hardness and slip of the coatings.

Certain resins or blending agents are preferably included in the coating composition in order to improve the transparency and gloss of the coated sheet. In general, the addition of resins also improves the adhesion of these coatings to the base sheet and improves the heat sealing properties of the latter. Those resins are preferred which are compatible with both the thermoplastic rubber derivative and the moistureproofing agent, such resins serving to blend the rubber derivative with the paraffin.

The relative proportions of the ingredients constituting the coating composition may vary within comparatively wide limits depending upon the specific materials used and the properties desired in the final product. Hitherto it has not been believed possible to have the condensation of rubber present in over 30% by weight of the solids of the composition without having a hazy or blushed coating. However, by means of the present invention in which solvents for oxidized condensation derivatives are incorporated in the composition it is possible to have the condensation derivatives present in as high as 60% with 10% wax and 10% solvent for oxidized condensation derivatives without having a hazy or blushed coating.

The concentration of the wax or wax-like material in the composition may range from zero to 75% or more. It will range from 0 to 10% for the glass clear type of coating composition.

The proportion of resin when used may also vary within wide limits, depending upon the type of resin used and the type of coating desired. The concentration of the various resins may range from 0 to 60% with a preferred range of 10 to 40%.

The concentration of the solvent for the oxidized condensation derivative may also vary widely. It should be present with the condensation derivative in such amount that on heating the composition a readily flowable composition may be attained but not in such amount as to give excessive tackiness at room temperature. In general the range of solvent should be between 10 to 30% of the weight of the composition.

In preparing a coating composition melt of the type above described, the following method is preferred. The ingredients are placed together in a mixer or shredder which can be heated. The temperature of the mixture is raised to about 140° C. and the mixture is kneaded from two to four hours until it is uniform. The mixture may be examined from time to time to determine when complete dispersion has taken place and when a sample is uniform and free from lumps, the mixture is removed and is ready for use in coating the base sheet.

Alternatively, the thermoplastic rubber derivative may first be dissolved in a suitable solvent such as, for example, toluene, and the other ingredients added to the solution in the desired amounts, after which the solvent is evaporated at an elevated temperature. The solvent removal may be speeded up by carrying out the evaporation under reduced pressure. When the solvent has been completely removed, there remains a uniform melt consisting of the thermoplastic rubber derivative completely dispersed in the other ingredients of the composition. The former method of obtaining a melt is preferred because it is more rapid and also less expensive. On the other hand, it may in certain cases be necessary to use the latter method in order to get a particular composition into a smooth, homogeneous, molten mass.

The base sheet may be coated with the above described compositions in a manner which consists in general in passing the sheet through a melted composition which is maintained at a temperature of about 140° C., by means of an electrically heated oil bath. Immediately after the sheet has been passed through the melted composition, the excess coating which is still in the molten state is removed by means of hot doctor knives. These knives are preferably heated to a temperature equal to that of the melt or somewhat higher. Best results are obtained by passing the coated sheet between several sets of doctor knives, in which case the first set of knives have a smoothing out action upon the coating, thus eliminating streaks thereon.

After the coated sheet leaves the last set of doctor knives, the coating is still in the molten condition, and it is essential that the coating be allowed to cool and solidify before it comes in contact with any rolls or other parts of the coating apparatus. The cooling of the coating may be accomplished in any desired manner such as blowing a cold blast of air against the melted coating surface.

To more clearly set forth the practice in accordance with this invention and to more specifically point out the nature of the composition contemplated thereby, several specific, illustrative examples are hereinafter set forth, it being understood that these examples illustrate several embodiments which have given satisfactory results and are not intended to restrict the invention thereto:

*Example I*

Thermoplastic, resin-like rubber condensation derivative of the (b)-type_____ 50
Du Pont RH 35 (hydrocarbon resin having softening point of about 90° C.)_____ 40
Diamyldecahydronaphthalene_____ 40
Paraffin (M. P. 62° C.)_____ 10

The above coating composition was applied in the molten state to a sheet of glassine paper and gave a coating at room temperature which was glass clear and glossy in thickness of .00014" to .0014".

The same composition was applied in the molten state to cellulose acetate sheets (Kodapak) and gave a glossy film of excellent adhesion.

*Example II*

Thermoplastic resin-like condensation derivative of rubber of the (b)-type_____ 100
Du Pont RH 35 (hydrocarbon resin having softening point of about 90° C.)_____ 100
Paraffin (melting point 62° C.)_____ 10
Diamyldecahydronaphthalene_____ 40

The molten mixture was applied to paper by means of a heated cylinder, the paper being laid on a glass plate which was heated with a hot plate. Coatings approximately .021" were laminated with cotton batting and upholstery material by subjecting the composite sheets to slight pressure at 314° F. for one minute. Penetration was complete, and the adhesion was good.

*Example III*

Thermoplastic resin-like rubber condensation derivative of (b)-type_____ 50  50
Du Pont RH 35 (hydrocarbon resin having softening point of about 90° C.)____ 23  23
Diamylnaphthalene _____ 22
Triamylnaphthalene _____     22
Paraffin (melting point 62° C.)_____ 5   5

Light colored viscous compositions were produced at 320° F. The composition coated on paper gave a clear, glossy film.

*Example IV*

Thermoplastic resin-like rubber condensation derivative of the (b)-type_____ 50
Du Pont RH 35 (hydrocarbon resin having softening point of about 90° C.)_____ 23
Triamyl cyclohexane_____ 22
Paraffin (melting point 62° C.)_____ 5

*Example V*

Thermoplastic resin-like rubber condensation derivative of the (b)-type_____ 22
Stearic acid _____ 3
Du Pont RH 35 (hydrocarbon resin having softening point of about 90° C.)_____ 15
Diamylnaphthalene _____ 10

An easily handled melt at 300° F. was produced. The coating on glassine was only very slightly tacky at 75° to 80° F. and was of satisfactory flexibility.

The trade name "Du Pont RH 35" is a dihydronaphthalene polymer made in accordance with the Scott Patent 2,108,213.

I claim:

1. A method of preparing a composition for use in hot melt coating, which method comprises heating to a molten condition a composition comprising a polyamyl naphthalene and a condensation derivative of rubber obtained by reacting rubber with a phenol and an acid isomerizing agent.

2. A method of preparing a composition for use in hot melt coating, which method comprises heating to approximately 140° C. and kneading a composition comprising a polyamyl naphthalene and a condensation derivative of rubber obtained by reacting rubber with a phenol and an acid isomerizing agent.

WILLIAM C. CALVERT.